United States Patent
Fuller (10) Patent No.: US 11,490,146 B2
(45) Date of Patent: *Nov. 1, 2022

(54) PUSH VIDEO ON DEMAND SCHEDULE SIMULATOR

(71) Applicant: ARRIS Enterprises LLC, Suwanee, GA (US)

(72) Inventor: Lee Fuller, Newton-le-Willows (GB)

(73) Assignee: ARRIS Enterprises LLC, Suwanee, GA (US)

(*) Notice: Subject to any disclaimer, the term of this patent is extended or adjusted under 35 U.S.C. 154(b) by 19 days.

This patent is subject to a terminal disclaimer.

(21) Appl. No.: 16/901,938

(22) Filed: Jun. 15, 2020

(65) Prior Publication Data

US 2020/0314475 A1 Oct. 1, 2020

Related U.S. Application Data

(63) Continuation of application No. 15/976,506, filed on May 10, 2018, now Pat. No. 10,687,104.

(51) Int. Cl.
*H04N 21/262* (2011.01)
*H04N 21/6543* (2011.01)
*H04N 21/443* (2011.01)

(52) U.S. Cl.
CPC . *H04N 21/26216* (2013.01); *H04N 21/26241* (2013.01); *H04N 21/4436* (2013.01); *H04N 21/6543* (2013.01)

(58) Field of Classification Search
CPC ......... H04N 21/26216; H04N 21/6543; H04N 21/4436; H04N 21/26241; H04N 21/4334; H04N 21/26233
See application file for complete search history.

(56) References Cited

U.S. PATENT DOCUMENTS

| | | | |
|---|---|---|---|
| 7,036,138 B1* | 4/2006 | Tash | H04N 5/445 |
| 9,762,941 B1 | 9/2017 | Propst | |
| 2002/0194598 A1 | 12/2002 | Connelly | |
| 2009/0187593 A1* | 7/2009 | Chen | G06F 17/30 |
| 2010/0138870 A1 | 6/2010 | Anthru et al. | |
| 2014/0240607 A1 | 8/2014 | Truong et al. | |
| 2016/0294956 A1 | 10/2016 | Fix | |
| 2017/0289597 A1 | 10/2017 | Riedel et al. | |

OTHER PUBLICATIONS

Australia Examination Report Re: Application No. 2019203306.

* cited by examiner

*Primary Examiner* — Anthony Bantamoi
(74) *Attorney, Agent, or Firm* — Chernoff, Vilhauer, McClung & Stenzel, LLP (57) ABSTRACT

In one embodiment, a method selects a first asset in a first ordering of assets and simulates a playout of the first asset based on bandwidth values at a set of times. The playout takes a time period to playout based on the set of bandwidth values. A new ordering of the assets is received based on the simulated playout of the first asset and the time period. The method continues to select a new asset in the new ordering of the assets, simulate the playout of the new asset, and receive a new ordering of the assets until a schedule of asset delivery is generated. Then, the schedule of asset delivery is output where the schedule of asset delivery is used by a receiver to determine when to power up to receive a scheduled delivery of an asset and power down when no asset is scheduled for delivery.

20 Claims, 6 Drawing Sheets

PUSH VIDEO ON DEMAND SCHEDULE SIMULATOR

This application is a continuation of U.S. patent application Ser. No. 15/976,506 filed on May 10, 2018, now U.S. Pat. No. 10,687,104, the content of which is hereby incorporated by reference in its entirety.

BACKGROUND

A push video on-demand (PushVOD) system may push assets to receivers at times when bandwidth is more readily available, such as during the nighttime. In areas that have low Internet connectivity or no Internet connectivity at times, which may mean that available bandwidth to transfer assets is low, the use of a PushVOD system may push the assets for storage at the receiver during times when available bandwidth is greatest. The pushing of the assets to the receiver allows a user to play these assets on demand without having to download the assets in real time. This improves the playback experience for the users in a low-bandwidth environment.

In the PushVOD system, a broadcast headend generates a delivery schedule of the PushVOD assets that includes a view of the expected time of the delivery per asset. The system generates the delivery manifest by ordering an asset list. The headend then sends the schedule to a receiver, such as a set-top box. The receiver uses the expected time of delivery to power up out of a low-power mode when any asset is scheduled to be received per the schedule. When the schedule indicates that no asset is to be received, the receiver can power down. This saves energy usage at the receiver as the receiver can power down when not scheduled to received assets.

Using the schedule may save power usage; however, if the schedule is off even by a few seconds, the receiver may power up at the wrong time and miss part of the download of the asset. Consequently, the entire download of the asset may not be usable because some of the video is not available. Further, if the receiver powers down at the wrong time, the receiver will similarly miss some of the download of the asset. Typically, some factors may affect the delivery of the assets, such as bandwidth may change throughout the day, the availability of the asset may change over time, and the playout of an asset alters the scheduling parameters. These factors may cause the schedule to be inaccurate.

DETAILED DESCRIPTION

Described herein are techniques for an asset delivery system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

Some embodiments use a schedule simulator to simulate the playout of assets to generate a schedule for a receiver. The system may order available assets for scheduling. For example, the assets A, B, C, D, and so on, may be ordered A, B, C, and D at first. Once asset A is played out, the order after the playout of asset A may not necessarily be asset B, C, D, etc. The order may change due to the playout of asset A, bandwidth changes over time, and asset availability over time. However, as discussed in the Background, the playout of previous assets was not taken into account when generating the schedule. This causes the schedule to possibly be wrong when used to download the assets.

During the simulation of the playout of asset A, the system uses the bandwidth B for a time T to determine how much of asset A is played out per the bandwidth and time. Then, the system increments the time T and the amount of asset A played out relative to the bandwidth and time T. The system continues to playout asset A using the bandwidth readings for time periods until asset A is played out. The simulation thus uses different bandwidth availabilities at different times in the simulation. The bandwidth availabilities may be set based on settings, such as from a database table to govern the available bandwidth at certain dates/times. The available bandwidth may also be predicted from historical availabilities.

After asset A is played out in the simulation, the system may revise the order of the assets based on the playout of asset A. For example, the system can change metadata based on the playout of asset A, such as increase the play count of asset A to represent that asset A has been played out. Then, the system may re-order the assets based on the new playout count of asset A. Further, the system can use the time taken to playout asset A. For example, given the time taken to playout asset A, other assets may become ineligible for playout because the assets expire after a certain amount of time. The system thus uses the simulated playout to regenerate the asset order. Once regenerating the asset order, the simulator may simulate the playout of another asset. The system reviews the asset order again after the playout of the asset, and this process continues to generate the schedule for a time period, such as 24 hours.

Because the schedule is simulated and the asset order is re-ordered after playing out an asset, the accuracy of the schedule is optimized and more accurate than generating a schedule that orders the assets a single time. The accuracy of the schedule also produces more efficient use of the PushVOD system because the receivers can power up and power down more accurately, which reduces the errors that occur because of the receivers powering up or powering down at the wrong times, which causes the receivers to miss some of the asset download. Also, the PushVOD system may generate a schedule which more closely matches the scheduling requirements, since the requirements are applied iteratively. The desired end-point being that all receivers receive all of the PushVOD assets as soon as possible.

System

Figure 1:
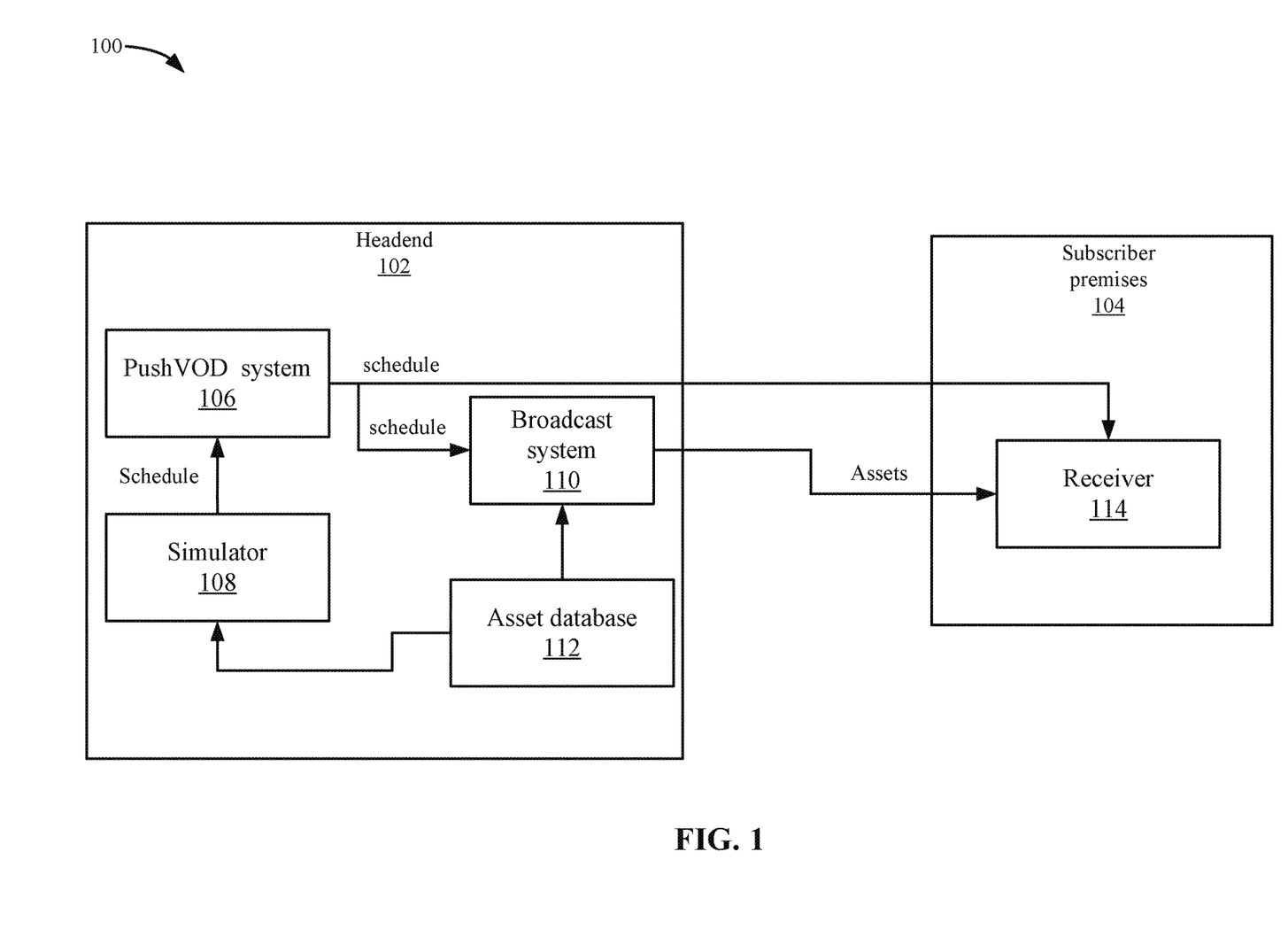
FIG. 1 depicts a simplified system of a method for simulating a schedule for a PushVOD system according to some embodiments.

FIG. 1 depicts a simplified system 100 of a method for simulating a schedule for a PushVOD system according to some embodiments. System 100 includes a headend 102 and subscriber premises 104. Headend 102 may be a system that can send assets to subscriber premises 104. In some embodiments, headend 102 broadcasts assets to receivers 114 on a linear schedule. Headend 102 may also offer an on demand service, which allows users to request videos on demand and not on a set schedule. Although headend 102 is described, other content delivery systems may be used to send assets to subscriber premises 104.

Headend 102 includes a PushVOD system 106 that can be used to push assets to a receiver 114 according to a schedule. As discussed above, the assets may be videos that PushVOD system 106 can send to receiver 114 for storing at receiver 114 at various times, such as times when the bandwidth availability is predicted to be high. PushVOD system 106 may cause the sending the assets to receiver 114 before a request to view the assets from a user is received. That is, the assets may be offered on demand; however, PushVOD system 106 had sent the assets before the request to improve the playback quality of the assets, which may be helpful in a low bandwidth environment. Because the assets are stored local to receiver 114 (e.g., internal to receiver 114 or within premises 104), receiver 114 does not have to download the asset in real-time when the request to view the assets on demand is received. Although a PushVOD system is described, other systems that push assets to receivers 114 may be used.

Receiver 114 may be customer premises equipment (CPE), such as a set-top box, television receiver, or other receiver devices. Receiver 114 includes storage that can store the assets before receiving a request to play an asset on demand. Receiver 114 can then facilitate the playback of the assets on a display device in the subscriber premises 104. For example, a user may request to view a video on-demand. However, in contrast to requesting the video on-demand from headend 102 and receiving the video in real time, receiver 114 can use the video that is stored in storage to playback the video in response to the on-demand request. The playback of the video from storage improves the playback quality in contrast to downloading the video over the network in real-time because the bandwidth availability may affect the playback quality of the video in real time. The PushVOD system provides a better experience for the user and a more efficient video on-demand playback system.

PushVOD system 106 uses a simulator 108 to generate the schedule to guide when receiver 114 should power up and power down. To generate the schedule, simulator 108 may receive assets that are available for scheduling from asset database 112. Simulator 108 then simulates the playout of the assets to generate the schedule. The generation of the schedule will be described in more detail below.

PushVOD system 106 receives the schedule and can send the schedule to receiver 114 and broadcast system 110. Broadcast system 110 uses the schedule to push assets to receiver 114. For example, the assets in the schedule may include a start time and an end time. When the start time is encountered, broadcast system 110 may then retrieve the asset from asset database 112 and send the asset to receiver 114. For example, an asset A may have a start time of 8:00 p.m. on a day #1 and an end time of 10:00 p.m. on day #1. When 8:00 p.m. on day #1 is encountered, broadcast system 110 then starts to send asset A to receiver 114. The broadcast may broadcast the asset, and any receivers 114 connected to broadcast system 110 will receive the asset Receiver 114 uses the schedule to determine when to power up and power down. For example, when an asset is to be received, receiver 114 will power up to a state in which receiver 114 can receive the asset. For example, at 8:00 p.m. on day #1, receiver 114 determines that asset A is going to be received and power up if the receiver is in a powered down mode. Then, at 10:00 p.m. on day #1 when the download of the asset ends, receiver 114 can power down if the schedule indicates no other asset is to be received at that time. The powering up and powering down of receiver 114 saves the energy use of receiver 114. The accuracy of the schedule is important because receiver 114 should power up and power down such that all portions of a video are downloaded.

Scheduler Simulation

Figure 2:
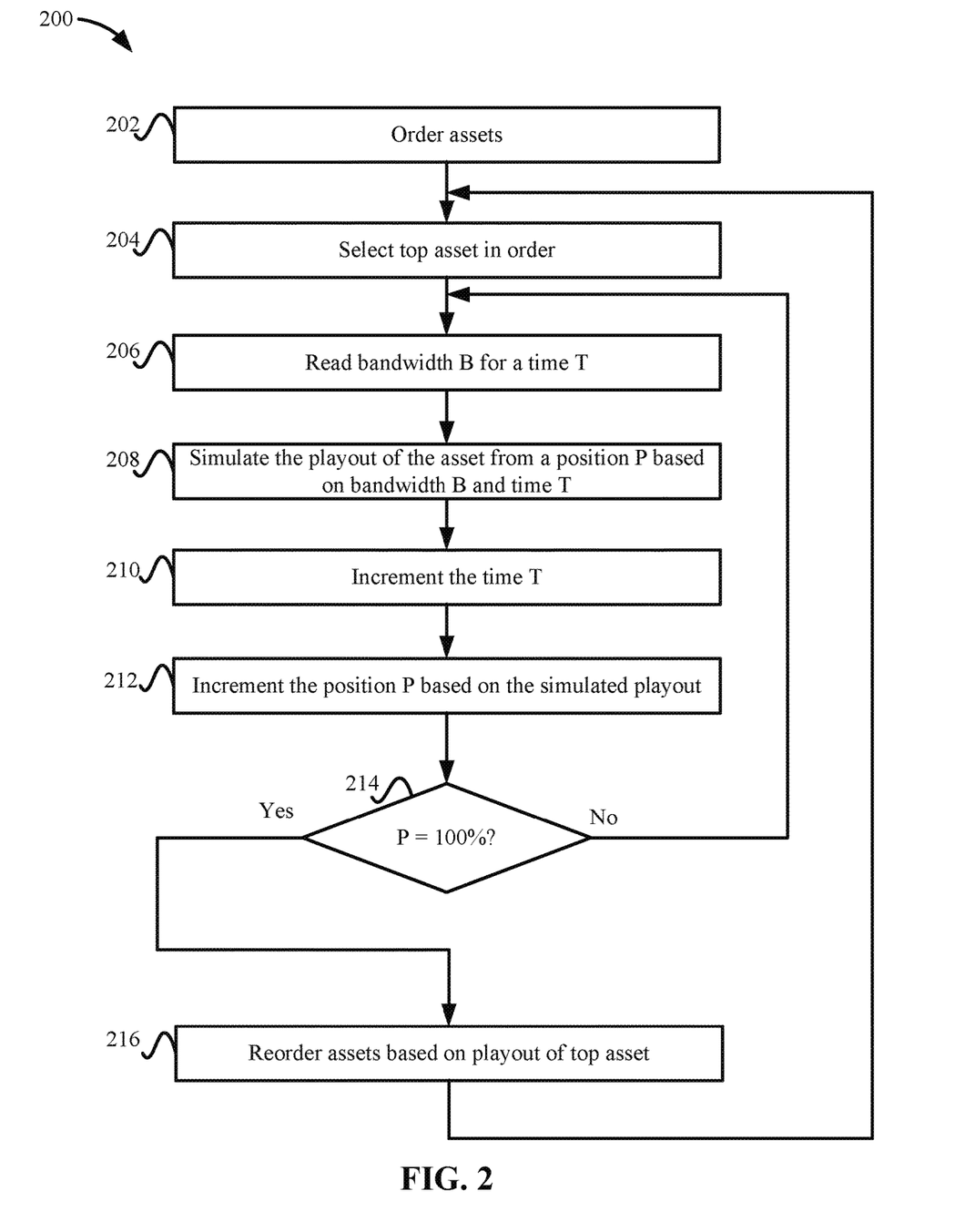
FIG. 2 depicts a simplified flowchart of a method for generating a schedule according to some embodiments.

FIG. 2 depicts a simplified flowchart 200 of a method for generating a schedule according to some embodiments. At 202, simulator 108 orders the assets that are available for the PushVOD system. For example, simulator 108 may send a request to asset database 112 for available assets. The available assets may include all assets in a catalog or may include a portion of the assets based on some criteria.

At 204, simulator 108 selects an asset, such as the top asset, in the order. The top asset may be the asset with the highest priority in the order. Although the top asset is described, simulator 108 may also select other assets in the order.

At 206, simulator 108 reads a bandwidth B for a time T. For example, the bandwidth may vary at different times on different days. A bandwidth schedule that describes the bandwidth over different dates and times may be used to determine bandwidth B for a time T. For example, at 8:00 p.m. on a Saturday, the bandwidth may be X bytes per second.

At 208, simulator 108 simulates the playout of the asset from a position P based on the bandwidth B and time T. The position P is the playout time of the asset. For example, when the playout begins, the position P may be the zero position. After playing out some portion of the asset, position P is incremented.

At 210, simulator 108 increments the time T. For example, the time T may be incremented by intervals, such as 1 second, 2 second, 10 second, 1 minute intervals. For example, if 10 seconds of time were simulated for playing out of the asset, then time T is incremented by 10 seconds.

At 212, simulator 108 increments the position P based on the simulated playout. For example, depending on the available bandwidth B, simulator 108 simulates different amounts of the asset for the playout. For a faster bandwidth, simulator 108 simulates the playout of more of the asset compared to when experiencing a slower bandwidth. For a slower bandwidth, simulator 108 simulates the playout of less of the asset compared to when experiencing a faster bandwidth. Based on how much of the asset was played out, simulator 108 increments position P in the asset.

At 214, simulator 108 determines if P equals 100% of the asset. That is, simulator 108 determines if the asset is finished being played out, such as reached the end of the video. It is noted that P=100% does not have to equal the end of the video. If the position P has not reached 100%, then the process reiterates to 206 to read a bandwidth B for a time T. As noted, the time T has been incremented and the bandwidth B may be different at that new time. The process then continues as described above.

If the position P does equal 100%, then at 216, simulator 108 re-orders the assets based on the playout of the top asset. The playout of the top asset changes the play count of the asset and also the time. That is, if the playout of the top asset took two hours, then the time has been incremented by two hours, such as from 8:00 p.m. to 10:00 p.m. The play count and the time may affect the ordering of the assets. The re-ordering is different from the Background where the schedule was produced sequentially without any other consideration of the previously-played out assets. After the re-ordering of the asset, the process reiterates to 204 to select the top asset. For example, if the previous order was assets A, B, C, D, the new order may not necessarily be assets B, C, and D after playing out asset A. It is possible that asset B may have expired and thus is not included in this order and asset C is now the top asset.

Asset Re-Ordering

Figure 3:
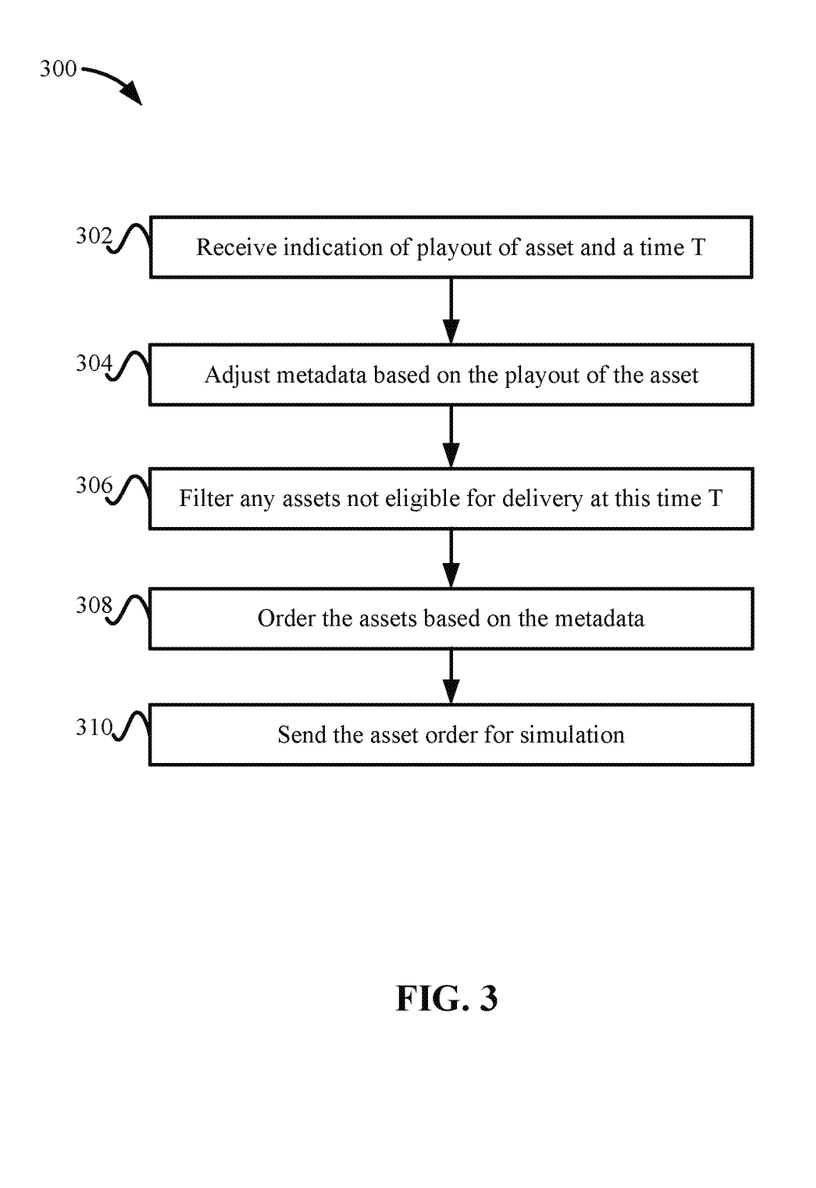
FIG. 3 depicts a simplified flowchart of a method for re-ordering the assets according to some embodiments.

FIG. 3 depicts a simplified flowchart 300 of a method for re-ordering the assets according to some embodiments. At 302, simulator 108 receives an indication of the playout of an asset in a time period. Simulator 108 uses the time period to determine the current simulated time based on the playout of the asset. For example, if asset A was played out between 8:00 p.m. and 10:00 p.m., the current simulated time may be 10:00 p.m.

At 304, simulator 108 adjusts metadata based on the playout of the asset. For example, the playout of an asset A may change metadata for asset A or other assets. Some changes to metadata may include the playout count, last playout time, priority, or expiration date. For example, simulator 108 may change the playout count and the last playout time based on the playout of asset A. Also, the priority of assets may change based on the playout of asset A.

At 306, simulator 108 filters any assets not eligible for delivery at this time T. For example, some assets may expire at certain times and if an asset has expired by the time the playout of asset A has occurred, then simulator 108 removes this asset. In other examples, the playout of an asset may reach the maximum playout count for an asset and simulator 108 removes that asset from the asset list.

At 308, simulator 108 orders the assets based on the metadata. The ordering may be based on the playout count, priority, expiration date, definition type (high-definition or standard-definition), last playout time, and/or size. Simulator 108 may use the metadata to order the assets in different ways. For example, simulator 108 schedules an asset with the highest priority and lowest playout count first. Other ordering processes may also be appreciated, such as the asset that has been played out the farthest back in time is played out next. In some embodiments, The ordering includes the concept of foreground and background states for each asset. An asset is in foreground state until it reaches a count of foregroundCount playouts. After which point, the asset enters a background state where the asset may not be considered for playout. The orderer also has the concept of a cooldown period—this is the period of time that an asset will not be considered for playout number playout_n+1 after playout_n. The orderer may use the following precedence:

Foreground items
Foreground counts remaining (higher is better)
Total plays (lower is better)
Priority (higher is better)
Visibility End date (earlier is better)
Definition (HD first)
Time since cooldown (longer is better)
Overall content size (smaller is better)

Finally, if all the above is equal for any two assets, the orderer uses an arbitrary tie-breaker (asset ID).

At 310, simulator 108 sends the asset order for simulation. Accordingly, instead of a static asset order for the simulation, simulator 108 re-orders the asset order upon playout of an asset. Although the asset re-order is described as being performed after the playout of an asset A, the re-ordering may occur at different times, such as at certain time intervals or after multiple asset playouts.

Asset Delivery

Figure 4:
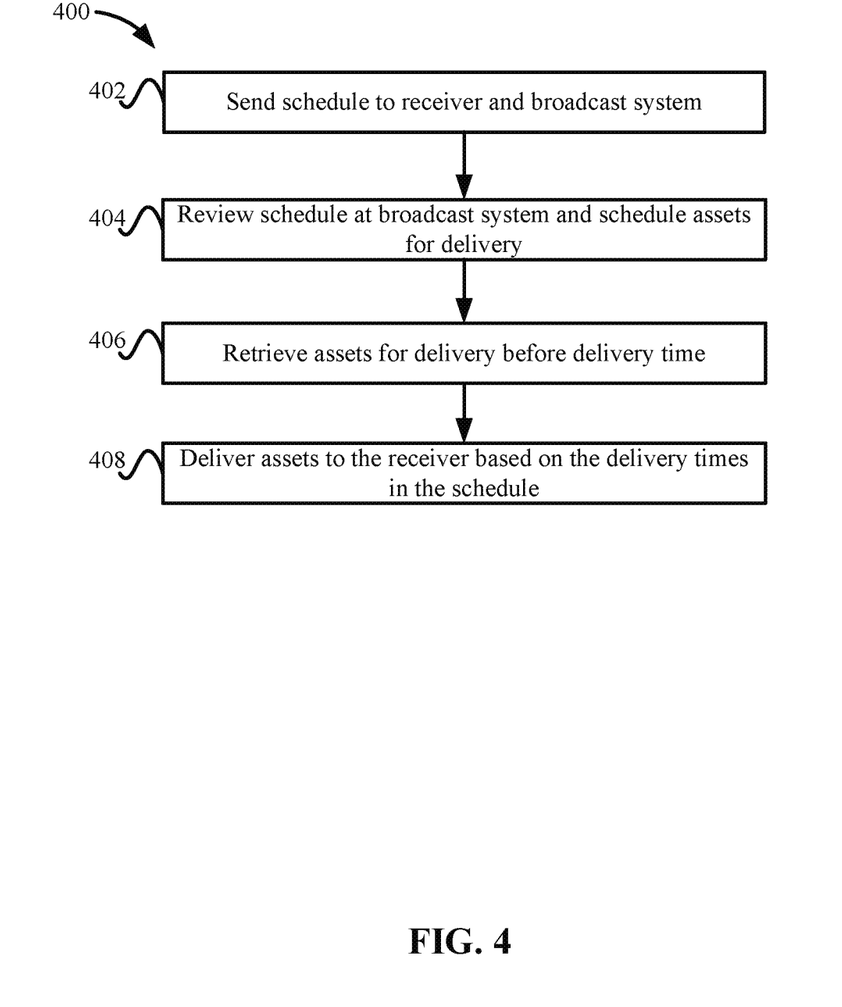
FIG. 4 depicts a simplified flowchart of a method for delivering assets according to a schedule according to some embodiments.

FIG. 4 depicts a simplified flowchart 400 of a method for delivering assets according to a schedule according to some embodiments. Upon generating the schedule, at 402, PushVOD system 106 sends the schedule to receiver 114 and broadcast system 110.

At 404, broadcast system 110 reviews the schedule and schedules assets for delivery. For example, the schedule may list the assets in an order and also include start times and end times for each asset.

At 406, broadcast system 110 retrieves assets for delivery on or before the delivery time from asset database 112. For example, if the delivery time is at 8:00 p.m., broadcast system 110 may retrieve asset A around 8:00 p.m. and deliver asset A to receiver 114. At 408, broadcast system 110 delivers assets to receiver 114 based on the delivery times in the schedule.

Asset Reception at the Receiver

Figure 5:
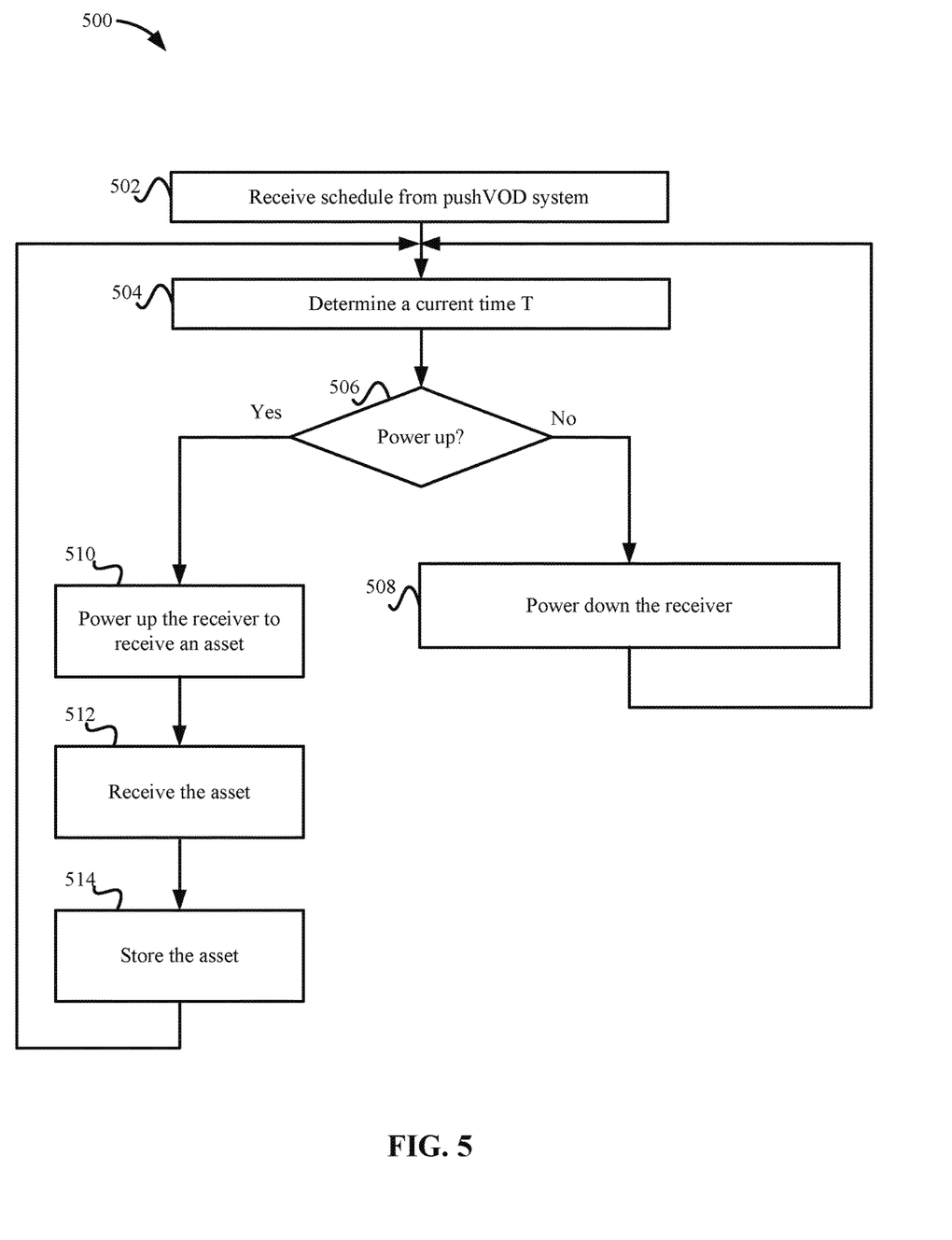
FIG. 5 depicts a simplified flowchart of a method for receiving assets at a receiver according to some embodiments.

FIG. 5 depicts a simplified flowchart 500 of a method for receiving assets at receiver 114 according to some embodiments. At 502, receiver 114 receives the schedule from PushVOD system 106. In some embodiments, receiver 114 downloads and processes the schedule only when receiver 114 detects if the schedule has changed. If receiver 114 determines the schedule has changed, then receiver 114 parses the schedule and sets up timers to power up to receive assets. Thereafter, at 504, receiver 114 determines a current time T. The current time T may be the time of 8:00 p.m. on day #1.

At 506, receiver 114 determines if it is time to power up. For example, receiver 114 may be powered down when not in use, and needs to power up to receive an asset. If it is not time to power up, then, at 508, receiver 114 powers down receiver 114. Alternatively, if receiver 114 is already powered down, then no action is needed.

If it is time to power up receiver 114, then at 510, receiver 114 performs a power-up action for receiver 114 to prepare to receive an asset. At 512, receiver 114 receives the asset while in the powered up state. For example, during a time period, such as between 8:00 p.m. and 10:00 p.m., receiver 114 is powered up and receives the asset.

At 514, receiver 114 stores the asset, such as in local storage. The process then reiterates to 504 to determine a current time T and continues to determine whether or not to power up or power down. For example, when the schedule indicates no asset will be received or receiver 114 is not interested in the asset (e.g., the asset has already been received and stored), receiver 114 can power down.

After storing the asset in storage, receiver 114 receives an input from a user to play the asset. Instead of downloading the asset from headend 102 in real time, receiver 114 may play the asset from storage. The playback from storage may be faster and include less buffering than downloading the asset over a network in real time.

CONCLUSION

Accordingly, some embodiments provide simulation of the delivery of assets for a PushVOD system. The simulation may re-order the assets upon the playout of an asset, which may provide a more accurate schedule. Additionally, the re-ordering may reduce the amount of errors in the schedule that may cause receiver 114 to miss downloading of part of the asset.

The simulation takes into account the playout of assets to generate the schedule. The schedule allows receiver 114 to determine when to power up and power down. Because the schedule is more accurate, the errors in delivering the asset at a time when receiver 114 is powered down are reduced. Further, the schedule is more accurate in delivering which assets should be delivered at certain times.

System

Figure 6:
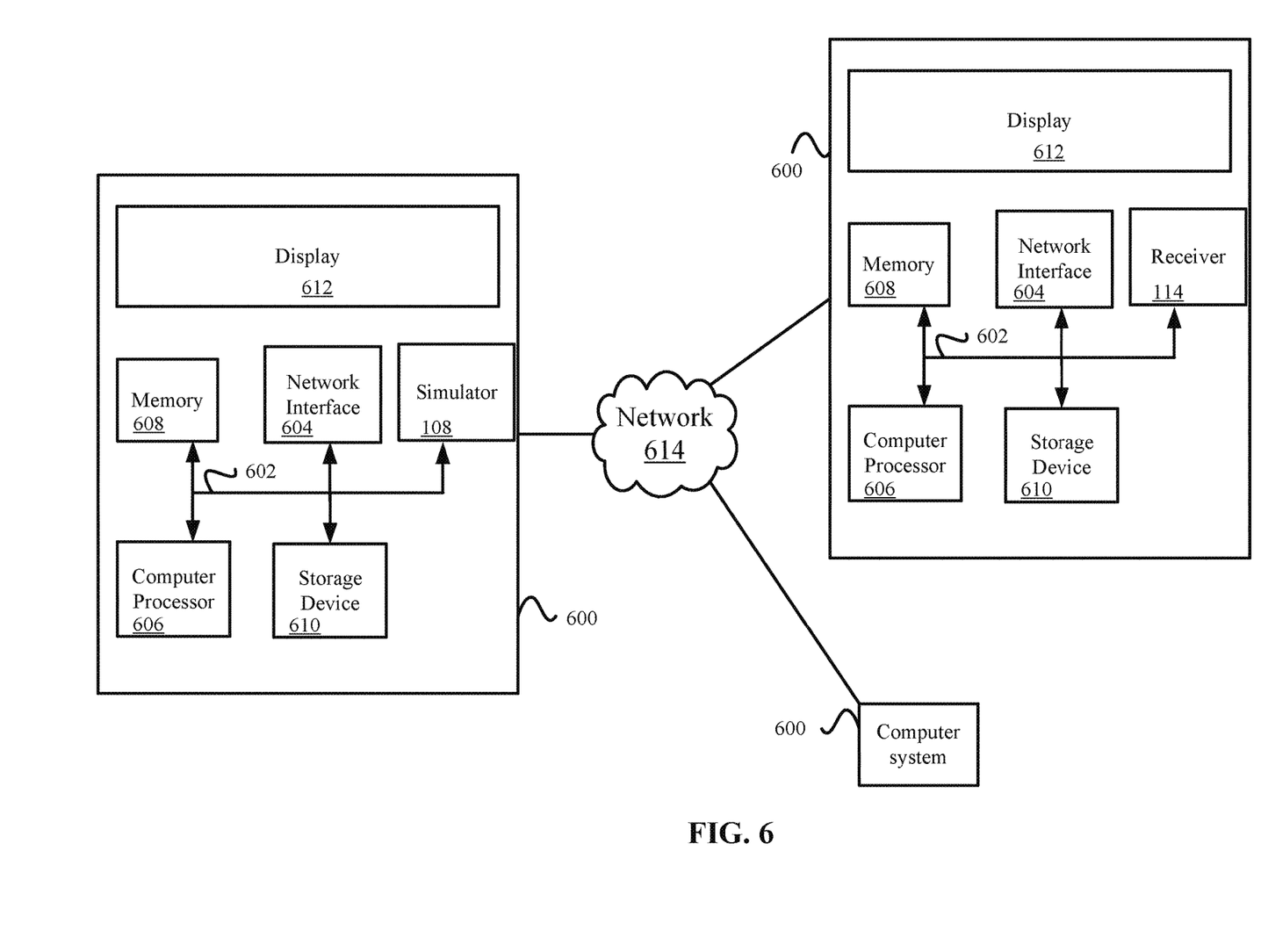
FIG. 6 illustrates an example of a special purpose computer systems configured with a simulator and the receiver according to one embodiment.

FIG. 6 illustrates an example of a special purpose computer systems 600 configured with simulator 108 and receiver 114 according to one embodiment. Computer system 600 includes a bus 602, network interface 604, a computer processor 606, a memory 608, a storage device 610, and a display 612.

Bus 602 may be a communication mechanism for communicating information. Computer processor 606 may execute computer programs stored in memory 608 or storage device 608. Any suitable programming language can be used to implement the routines of some embodiments including C, C++, Java, assembly language, etc. Different programming techniques can be employed such as procedural or object oriented. The routines can execute on a single computer system 600 or multiple computer systems 600. Further, multiple computer processors 606 may be used.

Memory 608 may store instructions, such as source code or binary code, for performing the techniques described above. Memory 608 may also be used for storing variables or other intermediate information during execution of instructions to be executed by processor 606. Examples of memory 608 include random access memory (RAM), read only memory (ROM), or both.

Storage device 610 may also store instructions, such as source code or binary code, for performing the techniques described above. Storage device 610 may additionally store data used and manipulated by computer processor 606. For example, storage device 610 may be a database that is accessed by computer system 600. Other examples of storage device 610 include random access memory (RAM), read only memory (ROM), a hard drive, a magnetic disk, an optical disk, a CD-ROM, a DVD, a flash memory, a USB memory card, or any other medium from which a computer can read.

Memory 608 or storage device 610 may be an example of a non-transitory computer-readable storage medium for use by or in connection with computer system 600. The non-transitory computer-readable storage medium contains instructions for controlling a computer system 600 to be configured to perform functions described by some embodiments. The instructions, when executed by one or more computer processors 606, may be configured to perform that which is described in some embodiments.

Computer system 600 includes a display 612 for displaying information to a computer user. Display 612 may display a user interface used by a user to interact with computer system 600.

Computer system 600 also includes a network interface 604 to provide data communication connection over a network, such as a local area network (LAN) or wide area network (WAN). Wireless networks may also be used. In any such implementation, network interface 604 sends and receives electrical, electromagnetic, or optical signals that carry digital data streams representing various types of information.

Computer system 600 can send and receive information through network interface 604 across a network 614, which may be an Intranet or the Internet. Computer system 600 may interact with other computer systems 600 through network 614. In some examples, client-server communications occur through network 614. Also, implementations of some embodiments may be distributed across computer systems 600 through network 614.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A computer-implemented method comprising:
   identifying from storage a first asset in a first ordering of assets, the assets being available for delivery to a receiver;
   performing a simulation of a playout of the first asset based on an estimated variance in bandwidth over a time interval beginning at a time prior to the playout of the first asset;
   selectively subsequently reordering the assets based on the simulation of the playout of the first asset and the time interval, and repeating the process of identifying a first asset in the reordered assets, performing said simulation, and selectively subsequently reordering the assets until a delivery manifest of asset delivery is generated; and
   outputting the delivery manifest of asset delivery to a receiver.

2. The method of claim 1, wherein the simulation comprises:
   selecting a top asset in the first ordering of assets as the first asset;
   reading a bandwidth value for a time in time interval; and
   simulating the playout of the top asset based on the bandwidth value for the time.

3. The method of claim 2, wherein the simulation comprises incrementing the time and incrementing a position of the playout of the top asset based on the simulated playout.

4. The method of claim 3, wherein the simulation comprises:
   determining when the position indicates all of the top asset has been played out;
   when the top asset has been played out, reordering the assets based on the playout of the top asset; and
   when the top asset has not been played out, reading a new bandwidth value for the incremented time and simulating the playout of the top asset based on the bandwidth value for the incremented time from the incremented position.

5. The method of claim 1, further comprising reordering the assets based on the playout of the first asset using metadata for the assets.

6. The method of claim 5, wherein the increased playout count of the first asset changes the ordering of the assets.

7. The method of claim 5, wherein the increased playout count of the first asset removes the first asset from the reordering of the assets.

8. The method of claim 1, further comprising re-ordering the assets based on increasing a playout count of the first asset.

9. The method of claim 1, wherein assets following the first asset in the first ordering of the assets are reordered relative to each other after the step of subsequently reordering.

10. The method of claim 1, further comprising changing metadata for one or more of the assets and reordering of assets based on the changed metadata.

11. An apparatus comprising:
a memory storing a plurality of assets arranged in a first order of assets beginning with a first asset, the plurality of assets being available for delivery to a receiver;
a processor configured to receive the first asset and perform a simulation of a playout of the first asset based on an estimated variance in bandwidth over a time interval beginning at a time prior to the playout of the first asset;
the processor also configured to selectively, subsequently reorder the assets based on the simulation of the playout of the first asset and the time interval, and repeat the process of receiving a first asset in the reordered assets, performing said simulation, and selectively subsequently reordering the assets until a delivery manifest of asset delivery is generated; where the apparatus outputs the delivery manifest of asset delivery to the receiver.

12. The device of claim 11, wherein the processor performs the simulation by:
selecting a top asset in the first ordering of assets as the first asset;
reading a bandwidth value for a time in time interval; and
simulating the playout of the top asset based on the bandwidth value for the time.

13. The device of claim 12, wherein the processor performs the simulation by incrementing the time and incrementing a position of the playout of the top asset based on the simulated playout.

14. The device of claim 13, wherein the processor performs the simulation by:
determining when the position indicates all of the top asset has been played out;
when the top asset has been played out, reordering the assets based on the playout of the top asset; and
when the top asset has not been played out, reading a new bandwidth value for the incremented time and simulating the playout of the top asset based on the bandwidth value for the incremented time from the incremented position.

15. The device of claim 11, wherein the processor is configured to reorder the assets based on the playout of the first asset using metadata for the assets.

16. The device of claim 15, wherein the increased playout count of the first asset changes the ordering of the assets.

17. The device of claim 15, wherein the increased playout count of the first asset removes the first asset from the reordering of the assets.

18. The device of claim 11, wherein the processor is configured to reorder the assets based on increasing a playout count of the first asset.

19. The device of claim 11, wherein assets following the first asset in the first ordering of the assets are reordered relative to each other by the processor.

20. The device of claim 11, where the processor changes metadata for one or more of the assets and reorders assets based on the changed metadata.

\* \* \* \* \*